(12) United States Patent
Jardine-Skinner et al.

(10) Patent No.: US 8,595,621 B2
(45) Date of Patent: *Nov. 26, 2013

(54) TRUNCATING CHARACTER STRINGS TO GENERATE A LIST OF UNIQUE CHARACTER STRINGS

(75) Inventors: Evan G. Jardine-Skinner, Southampton (GB); David J. Seager, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/421,722

(22) Filed: Mar. 15, 2012

(65) Prior Publication Data

US 2012/0226973 A1 Sep. 6, 2012

Related U.S. Application Data

(63) Continuation of application No. 12/270,728, filed on Nov. 13, 2008, now Pat. No. 8,239,758.

(51) Int. Cl.
*G06F 17/00* (2006.01)

(52) U.S. Cl.
USPC ............... 715/254; 715/205; 715/256

(58) Field of Classification Search
None
See application file for complete search history.

(56) References Cited

U.S. PATENT DOCUMENTS

| 5,761,436 | A | 6/1998 | Nielsen |
| 6,249,782 | B1 | 6/2001 | Day et al. |
| 7,165,264 | B1 | 1/2007 | Westrick |
| 7,168,039 | B2 | 1/2007 | Bertram |
| 7,716,580 | B2 | 5/2010 | Roto et al. |
| 7,809,697 | B1 | 10/2010 | Kanefsky et al. |
| 7,831,547 | B2 | 11/2010 | Epling et al. |
| 2006/0250834 | A1 | 11/2006 | Chinn et al. |
| 2009/0327947 | A1 | 12/2009 | Schreiner et al. |

OTHER PUBLICATIONS

HTTP://SMORGASBORK.COM, "Intelligent Abbreviation of Text (pretty_subtr)", located at http://smorgasbork.com/php/34-php/56-intelligent-abbreviation-of-text-prettysubstr, Apr. 14, 2008, pp. 1-3, United States.
Barbara Mckee et al., "Introducing IBM WebSphere Service Registry and Repository, Part 1: A day in the life of WebSphere Service Registry and Repository in the SOA life cycle," published at http://www.ibm.com/developerworks/websphere/library/techarticles/0609_mckee/0609_mckee.html, Sep. 19, 2006, pp. 1-5, United States.
Barbara Mckee et al., "Introducing IBM WebSphere Service Registry and Repository, Part 2: Architecture, APIs, and content," published at http://www.ibm.com/developerworks/websphere/library/techarticles/0609_mckee2/0609_mckee2.html, Sep. 29, 2006, pp. 1-9, United States.
U.S. Non-Final Office Action for U.S. Appl. No. 12/270,728 mailed Jul. 22, 2011.
U.S. Notice of Allowance for U.S. Appl. No. 12/270,728 mailed Jan. 10, 2012.

*Primary Examiner* — Stephen Hong
*Assistant Examiner* — Asher Kells
(74) *Attorney, Agent, or Firm* — Kenneth L. Sherman, Esq.; Michael Zarrabian, Esq.; Sherman & Zarrabian LLP

(57) ABSTRACT

A method and system for truncating character strings in a computing environment. One implementation involves receiving a list including plural character strings, truncating one or more of the character strings to generate a display list of unique character strings based on determining a truncation location within each string by: for each character string, comparing the string and corresponding Uniform Resource Identifier (URI), if the string is different from the URI, then truncating the beginning of the string, otherwise if the string matches the URI, then truncating the end of the string.

21 Claims, 8 Drawing Sheets

← 60

Long Heirarchy

Descriptions of the factions in...
Services in various geographic r...

Mr Funkste

....com/y| Services in various geographic regions on vari
....com/y| hardware and software
...m/yoyoyo.owl#RockNRollStarPeople
...eBeat.com/yoyoyo.owl#ThisIsWeird
...c394-4718-4090-b4cc-8a60849918ff
...6fdf-1990-44b3-ae48-36c286ec524f

FIG. 4

12
TRUNCATING CHARACTER STRINGS TO GENERATE A LIST OF UNIQUE CHARACTER STRINGS

CROSS-REFERENCE TO RELATED APPLICATIONS

This patent application is a continuation patent application of U.S. patent application Ser. No. 12/270,728, filed on Nov. 13, 2008 now U.S. Pat. No. 8,239,758, the disclosure of which is incorporated herein its entirety by reference.

BACKGROUND

1. Field of the Invention

The invention relates generally to information display, and more particularly, to character string display on a user interface in a computing environment.

2. Background Information

When labels or messages on a user interface such as a web browser are too long to fit into a specific width area, they need to be truncated. Conventional approaches involve truncating the label and placing ellipsis at the end ( . . . ), with a hover tooltip showing the full text, e.g. "My Labe . . . " (for "My Label Is Shown").

In the case of editing a Web Ontology Language (OWL) file, if a classification in the system does not have a label, then the OWL Uniform Resource Identifier (URI) is used as the label. These are typically of the form, e.g., http://www.ibm.com/classification/business/data/ and usually all start with the same URI in a given classification system. Therefore, truncating these at the end is not desirable. If several labels are shown, they will all be "http://www.ibm.com/class . . . " and as such, the user must hover them to discover meaningful information.

Furthermore, the OWL URI is not guaranteed to provide meaningful information since an entity is free to dictate the structure of its URIs (e.g., http://www.business.com/hr/classification, http://www.business.com/services/classification, http://www.business.com/development/classification) whereby a solution which uses a fixed position to truncate from is problematic.

BRIEF SUMMARY

The invention provides a method and system for truncating character strings in a computing environment. One embodiment involves receiving a list including plural character strings, truncating one or more of the character strings to generate a display list of unique character strings based on determining a truncation location within each string.

Determining an essentially optimal truncation location may include: for each character string, comparing the string and corresponding Uniform Resource Identifier (URI), if the string is different from the URI, then truncating the beginning of the string, otherwise if the string matches the URI, then truncating the end of the string.

Determining an essentially optimal truncation location may include: placing the original character strings to be displayed in an original list, creating a new END list from the strings by truncating each original string at the end of the string, scoring each truncated string in the END list for similarity to other strings in the END list, creating a new BEGIN list of strings by truncating each original string at the beginning of the string, scoring each truncated string in the BEGIN list for similarity to other strings in the BEGIN list, creating a new MIX list of strings from the best scoring truncated strings, scoring each string in the MIX list for similarity to other strings in the MIX list, summing the scores in each list to create a total score for each list, and selecting the list with the lowest score as the display list.

These and other features, aspects and advantages of the invention will become understood with reference to the following description, appended claims and accompanying figures.

BRIEF DESCRIPTION OF THE SEVERAL VIEWS OF THE DRAWINGS

For a fuller understanding of the nature and advantages of the invention, as well as a preferred mode of use, reference should be made to the following detailed description read in conjunction with the accompanying drawings, in which:

FIG. 4 shows an example user interface illustrating truncated character strings, according to an embodiment of the invention;

DETAILED DESCRIPTION

The following description is made for the purpose of illustrating the general principles of the invention and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

The invention provides a method and system for intelligently truncating long messages in a service registry. In a service oriented architecture (SOA) environment, Service Registries contain documents that relate to services and the associated schemas, policies, etc. A registry application manages sets of data that can be multiply inter-connected by any number of relationships, where each data object may represent some physical artifact or business unit.

Embodiments of the invention involve a system for processing a set of labels which are to be displayed together, along with information about how many characters are to be displayed. Each embodiment determines where to place the ellipsis and where to truncate the labels so that each label is as unique as possible with respect to the other labels. As such, the set of labels will not be all truncated to read confusingly the same. The embodiments are described below.

One embodiment of a truncation process according to the invention involves simple comparison of a display name to URI (this is classification specific). The most unique strings with front and back truncation are determined dynamically. The optimal location in the string to center the truncated portion on is then determined.

Figure 1:
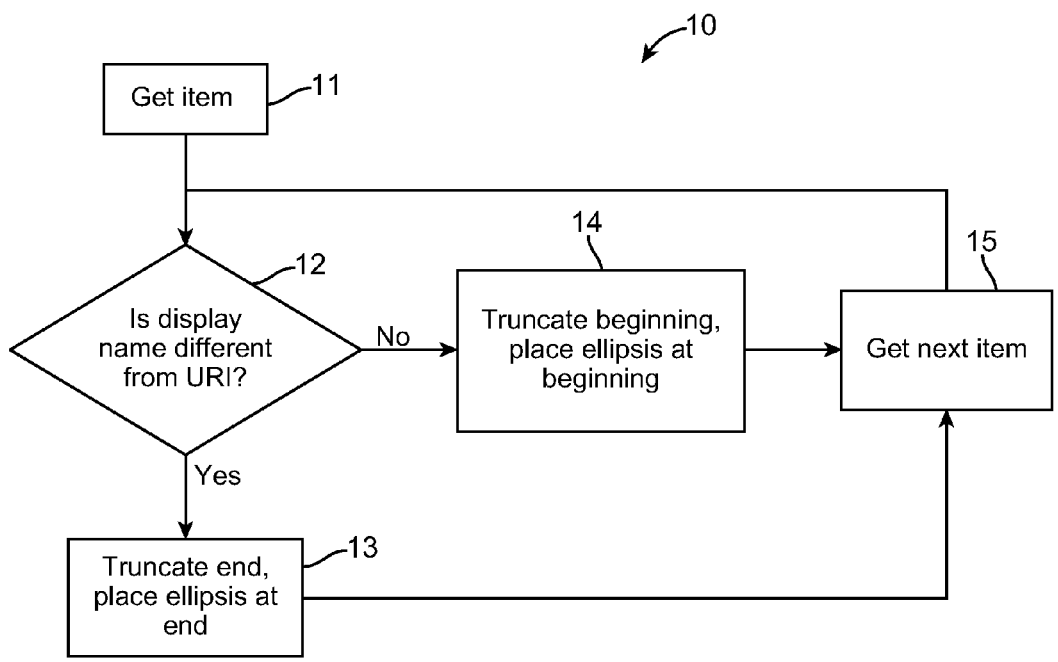
FIG. 1 shows a flowchart of a character string truncation process by simple comparison, according to an embodiment of the invention.

The truncation process is useful for displaying the classification/ontology class and system names. For each character string item in the list to be displayed, both the display name and the corresponding URI are utilized. If the display name is different from the URI, then the name is truncated at the end and ellipsis placed where the truncated text has been removed. If the display name matches the URI, then name is truncated at the beginning and ellipsis placed where the truncated text has been removed. FIG. 1 shows an example of a simple comparison truncation process 10 including:

Step 11: Obtain next string item for the list of names to be displayed.
    Step 12: Determine if the display name of the item is different from its URI? If not, proceed to step 14, otherwise, proceed to step 13.
    Step 13: Truncate end of the item, place ellipses at the end of the item. Proceed to step 15.
    Step 14: Truncate beginning of the item, place ellipsis at the beginning of the item. Proceed to step 15.
    Step 15: Get next item and proceed to step 12.

The so truncated strings are provided for display names on a user interface. Example truncations based on the above process include:

| Original | Truncated |
| --- | --- |
| DaveCo Classification System | DaveCo Cla . . . |
| http://daveco.com/sys/enterprise | . . . nterprise |
| http://daveco.com/sys/seven | . . . /sys/seven |
| System Three | System Thr . . . |

In another implementation, the invention provides a truncation process using scoring, including: placing the original character strings to be displayed in an original list, creating a new END list of strings by truncating each original string at the end of the string, scoring each truncated string in the END list for similarity to other strings in the END list, creating a new BEGIN list of strings by truncating each original string at the beginning of the string, scoring each truncated string in the BEGIN list for similarity to other strings in the BEGIN list, creating a new MIX list of strings from the best scoring truncated strings from the BEGIN or END lists, scoring each string in the MIX list for similarity to other strings in the MIX list, summing the scores in each list to create a total score for each list, and selecting the list with the lowest score as a list of strings for display names on a user interface.

An example of a scoring algorithm for similarity involves, for each string in a list, comparing the string with every other string in the list, removing the ellipsis from both strings in the comparison, and if the entire strings match, then the length of the string is squared and selected as the score, otherwise considering the number of sequentially matching characters from the beginning of the string is selected as the score. In this algorithm a perfect score is 0. Other algorithms can be used for scoring.

Figure 2:
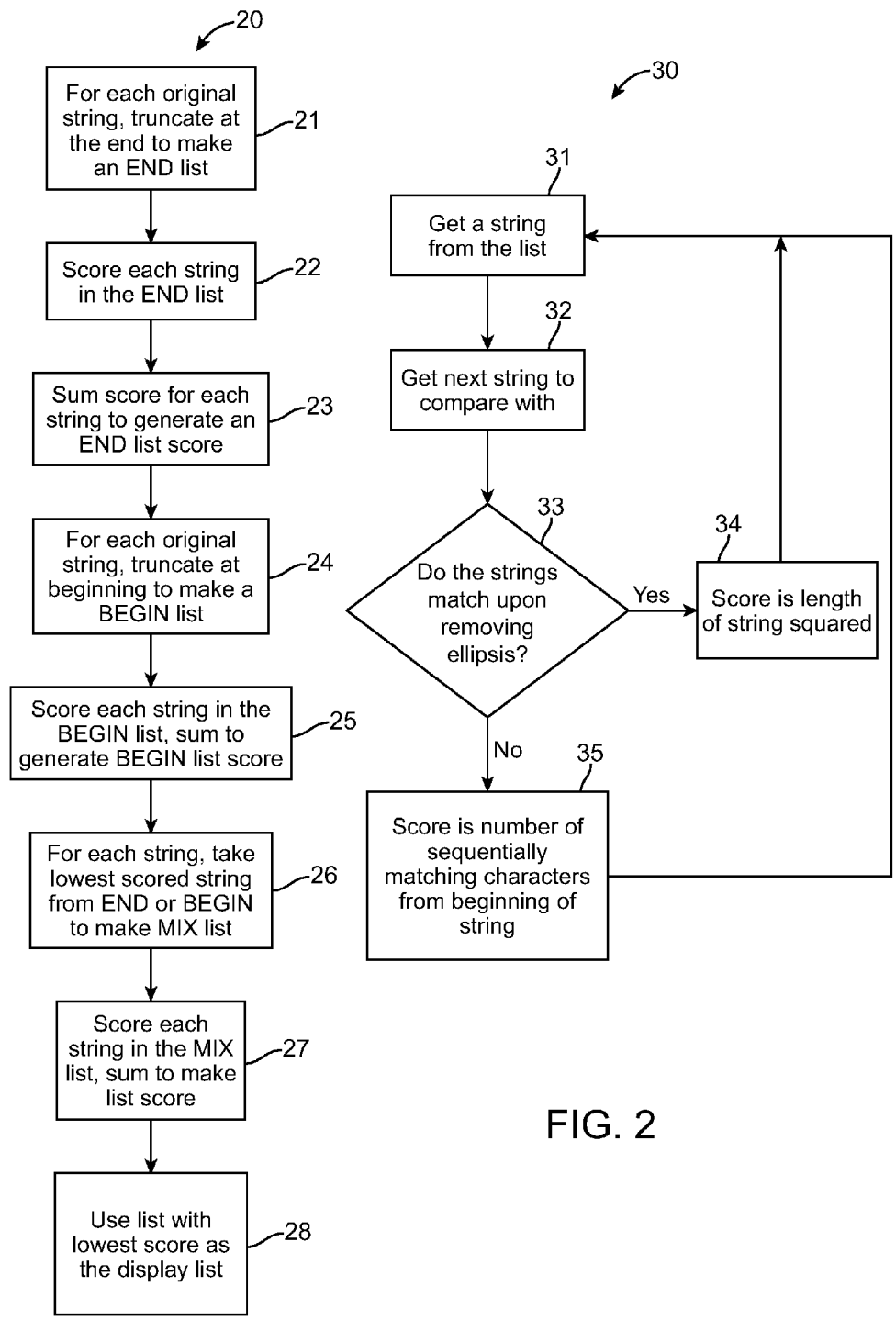
FIG. 2 shows a flowchart of a character string truncation process by string scoring, according to an embodiment of the invention.

An implementation of a truncation process 20 using scoring according to the invention is shown in FIG. 2, including:

Step 21: For each original string in the original list, truncate the string at the end to make an END list.
    Step 22: Score each string in the END list for similarity.
    Step 23: Sum the score for each truncated string in the END list for similarity to generate an END list score.
    Step 24: For each original string in the original list, truncate the string at the beginning to make a BEGIN list.
    Step 25: Score each string in the BEGIN list, and then sum scores of all truncated strings in the BEGIN list to generate a BEGIN list score.
    Step 26: For each original string, take lowest scored truncated string from the END list or the BEGIN list to generate a MIX list of truncated strings.
    Step 27: Score each string in the MIX list for similarity, to generate a MIX list score.
    Step 28: Select a list among the END, BEGIN and MIX lists with the lowest score as a list of strings to display as names.

An implementation of a scoring process 30 for scoring strings in a list of truncated strings for similarity, according to the invention, is shown in FIG. 2, including:

Step 31: Get a string from the list as the current string.
    Step 32: Get a next string from the list to compare with.
    Step 33: Do the strings match upon removing ellipses from both strings? If yes, proceed to step 34, else proceed to step 35.
    Step 34: Score for the current string is selected as the length of the current string squared. Proceed to step 31.
    Step 35: Score for the current string is selected as the number of sequentially matching characters from beginning of the current string. Proceed to step 31.

The above steps 31-35 are repeated until all the strings in the list have been scored. In another implementation, the invention provides a truncation process for an optimal location within the string to place the truncated portion of the string. The process involves scoring each character in each string for similarity and then finding the lowest scoring N (where N is the truncated length) characters. If centering the truncated part in this way means that the truncated part does not reach either end of the string, then an ellipsis is placed there. As such, the strings are truncated at the beginning, end, or in between (e.g., middle) based on the optimum string portion to display. Ellipses will only be placed at both ends of the string if they are more than three characters off each end of the centered truncated portion of the string.

Scoring each character in each string involves, for each string in the list, for each character of each string, summing the number of other strings that have the same character at the same index (string position) to create a character index score. For example, the following four strings would have the respective scores for each character:

| Original string | Score per character |
| --- | --- |
| http://myclass/Echo | 3, 3, 3, 3, 3, 3, 3, 2, 2, 2, 2, 2, 2, 2, 2, 0, 0, 0, 0 |
| http://myclass/Repel | 3, 3, 3, 3, 3, 3, 3, 2, 2, 2, 2, 2, 2, 2, 2, 0, 0, 0, 0, 0 |
| http://otherss/Repel | 3, 3, 3, 3, 3, 3, 3, 0, 0, 0, 0, 0, 3, 3, 3, 2, 2, 2, 2, 2 |
| Class Label | 0, 0, 0, 0, 0, 0, 0, 0, 0, 0, 0 |

For a truncation length of ten, including ellipses, the following truncated versions of the four strings will be shown:

| Truncated string |
|---|
| ...ss/Echo |
| ...s/Repel |
| ...other... |
| Class L... |

An alternative is to compare each character in each string not only with the character at the same index in the other strings, but also with the characters at +N and −N indexes. This helps when portions of a string are offset slightly, such as in the following two strings:

http://thesamebit/unique
http://my/thesamebit/anotherone

Figure 3:
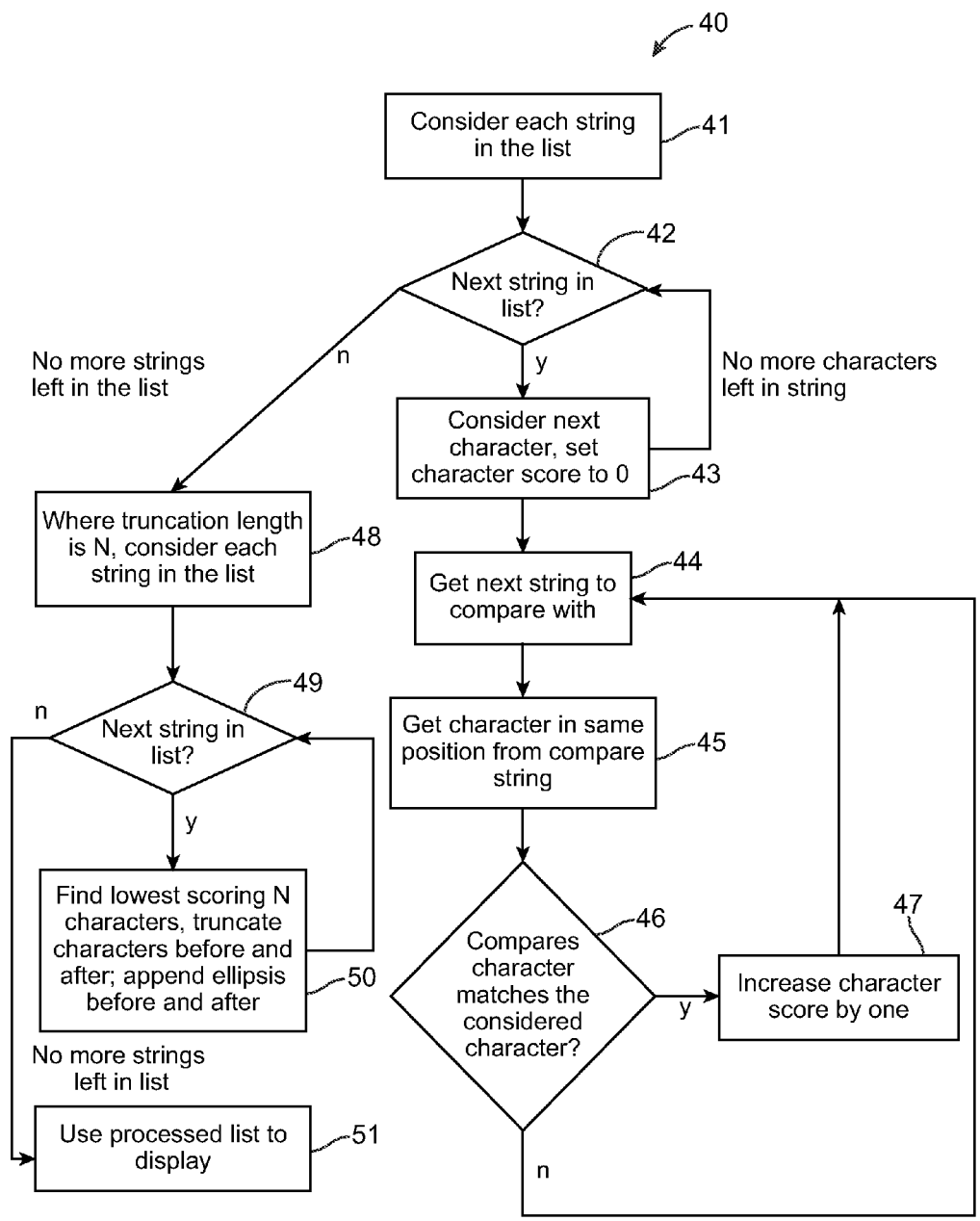
FIG. 3 shows a flowchart of a character string truncation process by optimal truncation placement, according to an embodiment of the invention.

An implementation of a truncation process 40 for an optimal location in the string to center the truncated portion of the string, according to the invention, is shown in FIG. 3, including:

Step 41: Consider each string in the list.
Step 42: Determine if next string in list? If yes, proceed to step 43, else proceed to step 48.
Step 43: Consider next character, set character score to 0. If no other characters left in the string proceed back to step 42, else proceed to step 44.
Step 44: Get next character and next string to compare with.
Step 45: Get character in same index position from compare string.
Step 46: Determine if the compared character matches the considered character?
If yes, proceed to step 47, else proceed to step 44.
Step 47: Increase character similarity score by one. Proceed to step 44.
Step 48: Where truncation length is N, consider each string in the list.
Step 49: Next string in list? If yes, proceed to step 50, else proceed to step 51.
Step 50: Find lowest scoring N characters, truncate characters before and after, append ellipsis before and after.
Step 51: Use processed list to display.

In one example, when the JSP (JavaServer Pages) is rendered on a web browser as a user interface (UI), for each label to be rendered, the UI looks up the truncated string from the list and renders that string, using the full label as hover help. FIG. 4 shows an example UI 60 with string truncating at the end.

The invention processes a list of strings that are to be displayed in context with each other. The invention determines essentially optimal truncation locations for insertion of ellipsis (at the start, end, or anywhere else in the string) in each string. This provides a list of unique strings that enables the user to differentiate between each string. One benefit is that the invention avoids a situation where a set of strings that start the same way are truncated such that the truncated strings look confusingly the same (e.g., the invention avoids the situation where all the strings start with "http://my.place/" and end up as truncated strings that all confusingly read "http://my.place/ ... "). Instead, the invention provides a list of unique strings that enables the user to differentiate between each string. This is done by determining essentially optimal truncation locations for insertion of ellipsis (at the start, end, or anywhere else in the string) in each string, as described further above.

Figure 5:
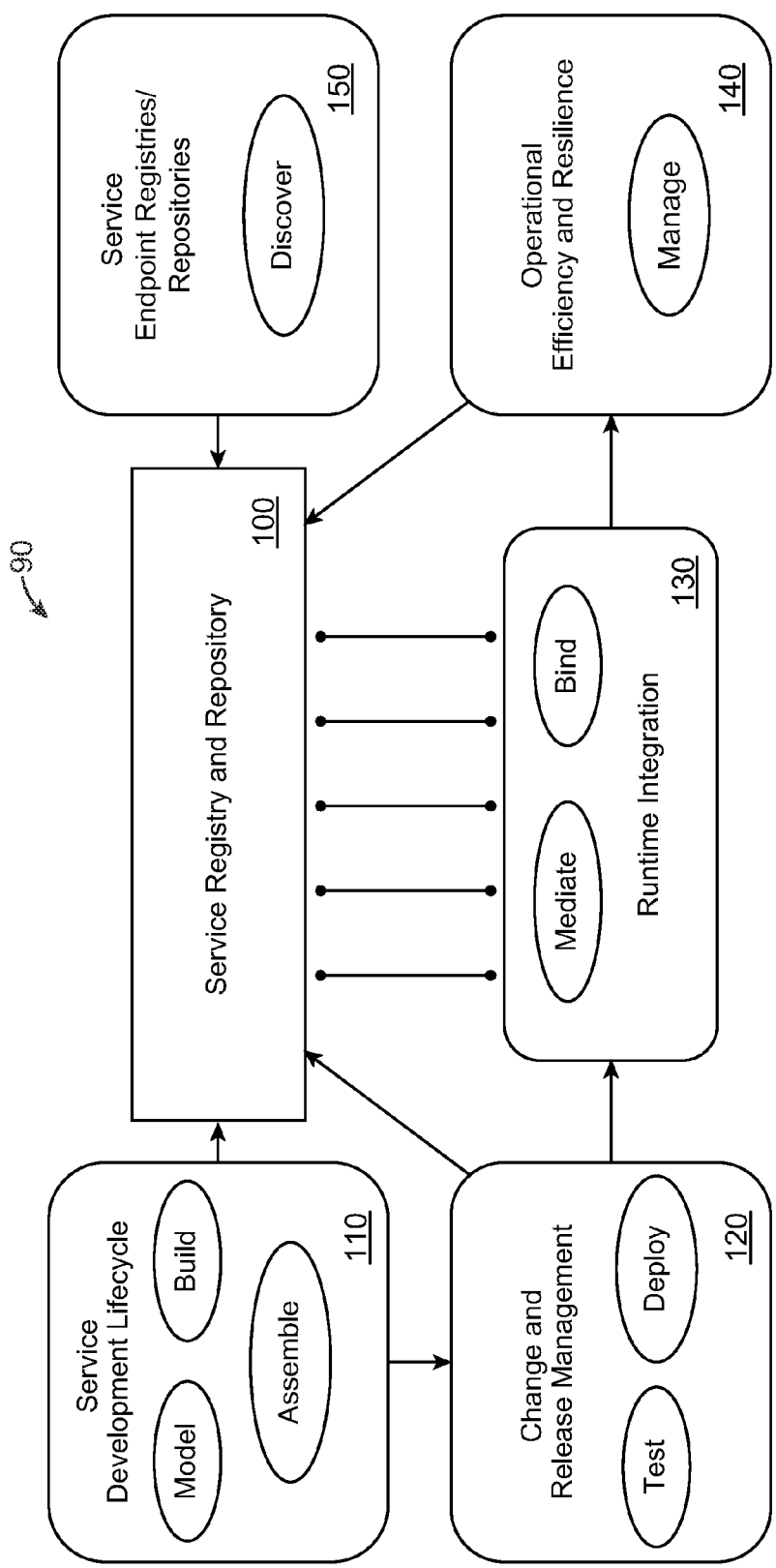
FIG. 5 shows a functional block diagram of a service oriented architecture (SOA) computing environment implementing an embodiment of the invention.

The invention is useful in many applications. An example application is in a service oriented architecture (SOA) computing environment. In the following, an example of service registry and repository in an SOA is described. As described in Barbara McKee et al., "Introducing IBM WebSphere Service Registry and Repository, Part 1: A day in the life of WebSphere Service Registry and Repository in the SOA cycle," published at http://www.ibm.com/developerworks/websphere/library/techarticles/0609_mckee/0609_mckee-.html, Sep. 19, 2006, and further described in Barbara McKee et al., "Introducing IBM Web Sphere Service Registry and Repository, Part 2: Architecture, APIs, and content," published at http://www.ibm.com/developerworks/websphere/library/techarticles/0609_mckee2/0609_mckee2.html, Sep. 29, 2006, (incorporated herein by reference), SOA separates service descriptions from their implementations, and uses this descriptive metadata across the service life cycle. Standards-based service metadata artifacts, such as Web Service Definition Language (WSDL), XML schema, Policy or Service Component Architecture (SCA) documents, capture the technical details of what a service can do, how it can be invoked, or what it expects other services to do. Service Registry and Repository is the master metadata repository for service interaction endpoint descriptions. As the integration point for service metadata, Service Registry and Repository establishes a central point for finding and managing service metadata acquired from a number of sources. It is where service metadata that is scattered across a computing enterprise is brought together to provide a single, comprehensive description of a service. FIG. 5 shows an example functional block diagram of an SOA 90 involving Service Registry and Repository (Service Registry or SR) 100. The SOA 90 further includes the following functions: Service Development Lifecycle 110, Change and Release Management 120, Runtime Integration 130, Operational Efficiency and Resilience 140, and Service Endpoint Registries/Repositories 150.

A business service is created in the model phase, and is translated into an executable composite application in the assemble phase, and then transitions into the SOA run time environment in the deploy and run phase, and is then observed and controlled in the manage phase.

During the development stages of the business service life cycle, the Service Registry and Repository 100 is used to locate the copies of record of candidate service interaction endpoints or mediating intermediaries, as well as, policies governing the interactions. As in the other SOA life cycle stages, the Service Registry and Repository 100 is complemented by repositories that specialize in managing SOA artifacts during the development stages of the life cycle. The Service Registry and Repository 100 provides the system of record for metadata describing service interaction endpoints.

Figure 6:
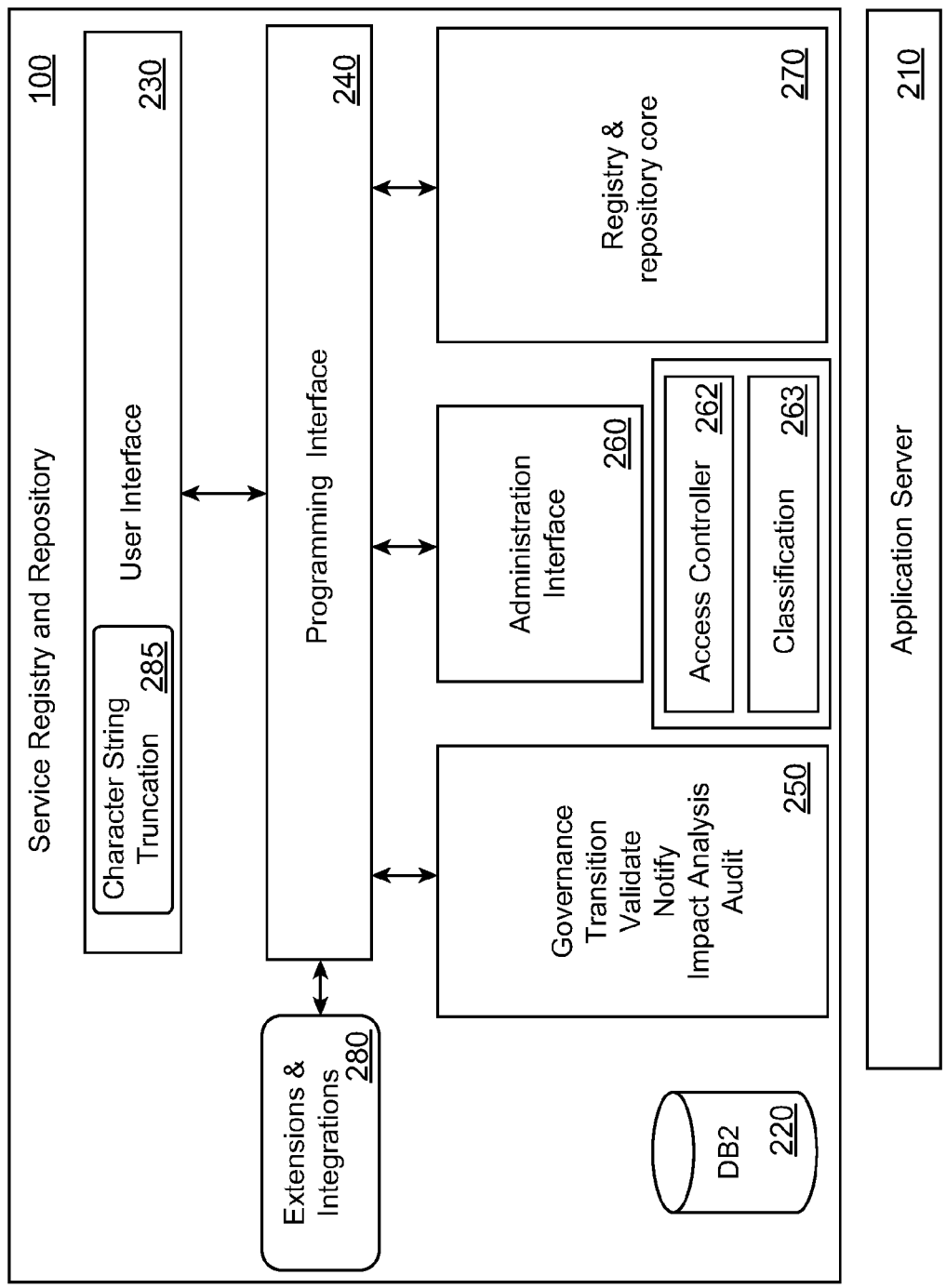
FIG. 6 shows a functional block diagram of a Service Registry and Repository in an SOA implementing an embodiment of the invention.

Referring now also to FIG. 6, an overview of the architecture of the Registry and Repository is now provided. The Service Registry and Repository 100 runs on an Application Server 210 in a computing environment, and uses a database 220 as a backing store for service metadata persistence. The Service Registry and Repository 100 includes a user interface 230 for interaction with the Registry and Repository programmatically, and for interaction with service metadata in Registry and Repository. The Registry and Repository contains service metadata artifacts that are in the form of XML documents, concepts that represent service metadata entities that are not backed by a document in Registry and Repository, semantic metadata assigned to these service metadata artifacts and entities, and relationships among and between the artifacts and entities. A Programming Interface 240 allows performing basic operations (e.g., Create, Retrieve, Update, and Delete) on the Service Registry and Repository content (FIG. 3), and queries based on expressions against the content.

The Service Registry and Repository core 270 offers both Registry and Repository capabilities for service metadata. The repository allows users to store, manage and query service metadata artifacts holding service descriptions (WSDL, XSD, WS-Policy, SCDL or XML documents). The Registry and Repository core 271 further provides performing basic operations (e.g., Create, Retrieve, Update, and Delete) on the content, and also provides a query interface for finding a service endpoint or service interface.

The governance functions 250 provide the ability to model a service life cycle model for governed entities, define valid transitions between service states, write and plug-in validators to guard the transitions between states, and designate (notification) actions to be taken as result of the transition. It also provides interfaces to analyze the impact of changes to Registry and Repository content, and provides auditing of such changes.

Classifications 263 are involved in many interactions with Registry and Repository, and allow annotation of service descriptions and parts of service definitions with corporate vocabulary. They are used by Registry and Repository to capture the governance state.

Access Controller 262 provides an access control model that defines which user roles can perform specific types of actions on corresponding artifacts. Administration Interface 260 supports the import and export of Registry and Repository content for exchange with other Registry and Repository repositories and provides API for Registry and Repository configuration and basic administration (supporting interactions with the Access Control model and with the Classification systems). Extensions and Integrations 280 can also be used via the Programming Interface 240.

Figure 7:
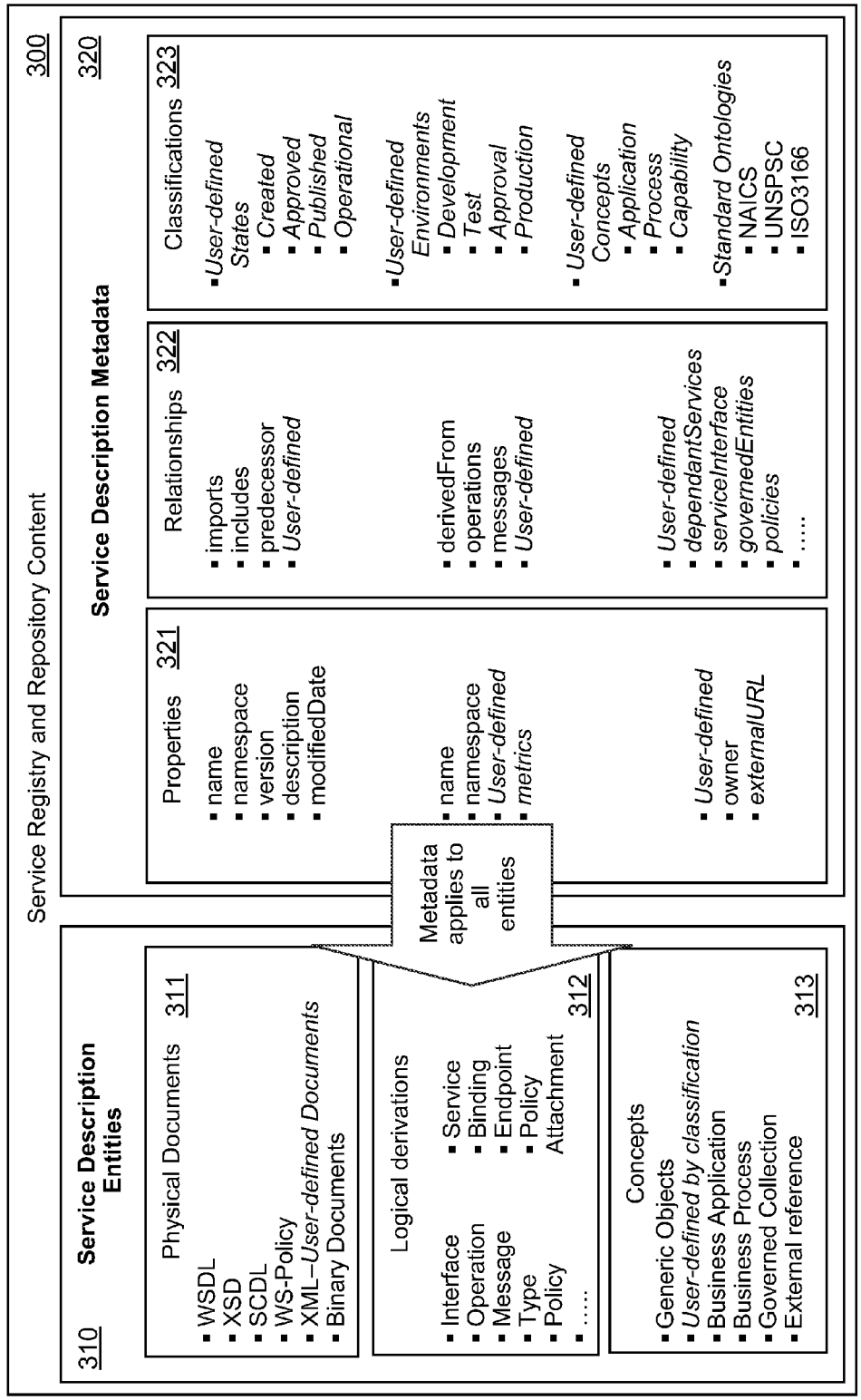
FIG. 7 shows a functional block diagram of content of a Service Registry and Repository implementing an embodiment of the invention.

Referring now also to FIG. 7, an example model for Registry and Repository content 300 is provided. The content model has entities representing service description artifacts and service description metadata. There are three kinds of Service Description Entities 310 that are stored and managed in Registry and Repository. Physical Documents 311 are XML documents that are known as service metadata artifacts. Logical derivations 312 are the finer-grained pieces of content that result when some types of physical document are shredded as they are loaded into Registry and Repository. Concepts 313 are generic entities that are usually typed, and represent anything that is not represented by a document in Registry and Repository.

Service Description Metadata 320 includes metadata types used to annotate the service description entities to explain their semantics. These include Properties 321, Relationships 322 and Classifications 323. Properties are simple name/value pairs that are associated with any of the Service Description Entities. Relationships tie together one source service description entity to one or more target service description entities. Classification systems may be loaded into Registry and Repository where they can then be used to apply semantic meanings to Service Description Entities.

According to an embodiment of the invention, the user interface 230 (FIG. 5) includes a character string truncation module 285 which implements intelligent character string truncation described above (e.g., FIGS. 1-3) according to embodiments of the invention. The string truncation module 285 may be a software module, a hardware module or a combination. Further, the string truncation module 285 may be implemented as a plug-in (e.g., downloadable plug-in software for web browser) for the user interface 230 rather being a component thereof.

As is known to those skilled in the art, the aforementioned example architectures described above, according to the invention, can be implemented in many ways, such as program instructions for execution by a processor, as software modules, microcode, as computer program product on computer readable media, as logic circuits, as application specific integrated circuits, as firmware, etc. Further, embodiments of the invention can take the form of an entirely hardware embodiment, an entirely software embodiment or an embodiment containing both hardware and software elements.

Figure 8:
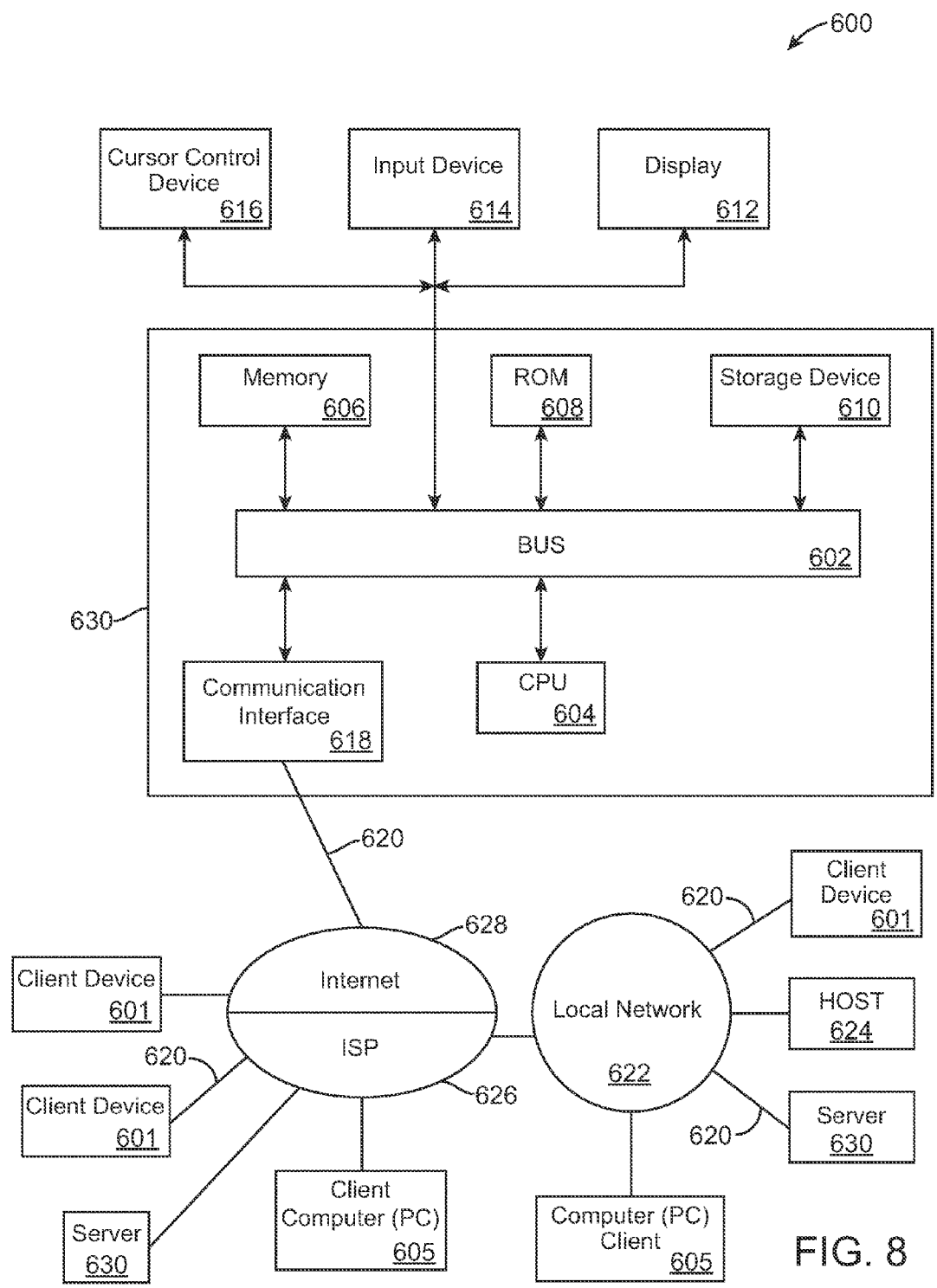
FIG. 8 shows a functional block diagram of an example computing environment for implementing an embodiment of the invention.

FIG. 8 shows a block diagram of an example architecture of an embodiment of a system 600 configured as above, according to an embodiment of the invention. The system 600 includes one or more client devices 601 connected to one or more server computing systems 630. A server 630 includes a bus 602 or other communication mechanism for communicating information, and a processor (CPU) 604 coupled with the bus 602 for processing information. The server 630 also includes a main memory 606, such as a random access memory (RAM) or other dynamic storage device, coupled to the bus 602 for storing information and instructions to be executed by the processor 604. The main memory 606 also may be used for storing temporary variables or other intermediate information during execution or instructions to be executed by the processor 604. The server computer system 630 further includes a read only memory (ROM) 608 or other static storage device coupled to the bus 602 for storing static information and instructions for the processor 604. A storage device 610, such as a magnetic disk or optical disk, is provided and coupled to the bus 602 for storing information and instructions. The bus 602 may contain, for example, thirty-two address lines for addressing video memory or main memory 606. The bus 602 can also include, for example, a 32-bit data bus for transferring data between and among the components, such as the CPU 604, the main memory 606, video memory and the storage 610. Alternatively, multiplex data/address lines may be used instead of separate data and address lines.

The server 630 may be coupled via the bus 602 to a display 612 for displaying information to a computer user. An input device 614, including alphanumeric and other keys, is coupled to the bus 602 for communicating information and command selections to the processor 604. Another type or user input device comprises cursor control 616, such as a mouse, a trackball, or cursor direction keys for communicating direction information and command selections to the processor 604 and for controlling cursor movement on the display 612.

According to one embodiment of the invention, the functions of the invention are performed in response to the processor 604 executing one or more sequences of one or more instructions contained in the main memory 606. Such instructions may be read into the main memory 606 from another computer-readable medium, such as the storage device 610. Execution of the sequences of instructions contained in the main memory 606 causes the processor 604 to perform the process steps described herein. One or more processors in a multi-processing arrangement may also be employed to execute the sequences of instructions contained in the main memory 606. In alternative embodiments, hard-wired circuitry may be used in place of or in combination with software instructions to implement the invention. Thus, embodiments of the invention are not limited to any specific combination of hardware circuitry and software.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired network or a wireless network, that allow a computer to read such computer readable information. Computer programs (also called computer control logic) are stored in main memory and/or secondary memory. Computer programs may also be received via a communications interface. Such computer programs, when executed, enable the computer system to perform the features of the invention as discussed herein. In particular, the computer programs, when executed, enable the processor multi-core processor to perform the features of the computer system. Accordingly, such computer programs represent controllers of the computer system.

Generally, the term "computer-readable medium" as used herein refers to any medium that participated in providing instructions to the processor 604 for execution. Such a medium may take many forms, including but not limited to, non-volatile media, volatile media, and transmission media. Non-volatile media includes, for example, optical or magnetic disks, such as the storage device 610. Volatile media includes dynamic memory, such as the main memory 606. Transmission media includes coaxial cables, copper wire and fiber optics, including the wires that comprise the bus 602. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave as described hereinafter, or any other medium from which a computer can read.

Various forms of computer readable media may be involved in carrying one or more sequences of one or more instructions to the processor 604 for execution. For example, the instructions may initially be carried on a magnetic disk of a remote computer. The remote computer can load the instructions into its dynamic memory and send the instructions over a telephone line using a modem. A modem local to the server 630 can receive the data on the telephone line and use an infrared transmitter to convert the data to an infrared signal. An infrared detector coupled to the bus 602 can receive the data carried in the infrared signal and place the data on the bus 602. The bus 602 carries the data to the main memory 606, from which the processor 604 retrieves and executes the instructions. The instructions received from the main memory 606 may optionally be stored on the storage device 610 either before or after execution by the processor 604.

The server 630 also includes a communication interface 618 coupled to the bus 602. The communication interface 618 provides a two-way data communication coupling to a network link 620 that is connected to the world wide packet data communication network now commonly referred to as the Internet 628. The Internet 628 uses electrical, electromagnetic or optical signals that carry digital data streams. The signals through the various networks and the signals on the network link 620 and through the communication interface 618, which carry the digital data to and from the server 630, are exemplary forms or carrier waves transporting the information.

In another embodiment of the server 630, interface 618 is connected to a network 622 via a communication link 620. For example, the communication interface 618 may be an integrated services digital network (ISDN) card or a modem to provide a data communication connection to a corresponding type of telephone line, which can comprise part of the network link 620. As another example, the communication interface 618 may be a local area network (LAN) card to provide a data communication connection to a compatible LAN. Wireless links may also be implemented. In any such implementation, the communication interface 618 sends and receives electrical electromagnetic or optical signals that carry digital data streams representing various types of information.

The network link 620 typically provides data communication through one or more networks to other data devices. For example, the network link 620 may provide a connection through the local network 622 to a host computer 624 or to data equipment operated by an Internet Service Provider (ISP) 626. The ISP 626 in turn provides data communication services through the Internet 628. The local network 622 and the Internet 628 both use electrical, electromagnetic or optical signals that carry digital data streams. The signals through the various networks and the signals on the network link 620 and through the communication interface 618, which carry the digital data to and from the server 630, are exemplary forms or carrier waves transporting the information.

The server 630 can send/receive messages and data, including e-mail, program code, through the network, the network link 620 and the communication interface 618. Further, the communication interface 618 can comprise a USB/Tuner and the network link 620 may be an antenna or cable for connecting the server 630 to a cable provider, satellite provider or other terrestrial transmission system for receiving messages, data and program code from another source.

The example versions of the invention described herein are implemented as logical operations in a distributed processing system such as the system 600 including the servers 630. The logical operations of the invention can be implemented as a sequence of steps executing in the server 630, and as interconnected machine modules within the system 600. The implementation is a matter of choice and can depend on performance of the system 600 implementing the invention. As such, the logical operations constituting said example versions of the invention are referred to for e.g., as operations, steps or modules.

Similar to a server 630 described above, a client device 601 can include a processor, memory, storage device, display, input device and communication interface (e.g., e-mail interface) for connecting the client device to the Internet 628, the ISP 626, or LAN 622, for communication with the servers 630.

The system 600 can further include computers (e.g., personal computers, computing nodes) 605 operating the same manner as client devices 601, wherein a user can utilize one or more computers 605 to manage data in the server 630.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. A method of truncating character strings in a computing environment, comprising:
   receiving a list including plural character strings; and
   truncating one or more of the character strings to generate a display list of unique character strings based on determining a truncation location within each string by:
      for each character string, comparing the string and corresponding Uniform Resource Identifier (URI), if the string is different from the URI, then truncating the beginning of the string, otherwise if the string matches the URI, then truncating the end of the string.

2. The method of claim 1, wherein truncating each character string further includes determining the truncation location at the start of the string or at the end of the string or in between, for generating a display list of character strings where each string is unique in relation to other strings.

3. The method of claim 1, wherein truncating each character string further includes truncating each of the character strings for generating a display list of unique truncated character strings.

4. The method of claim 3, further comprising scoring each character in the string for similarity to the other characters in the display list and then finding the lowest scoring N characters where N is the length of the truncated string.

5. The method of claim 1, further comprising displaying the character strings of the display list in context with each other on a user interface.

6. The method of claim 5, wherein each displayed character string is unique in relation to the other displayed character strings, enabling a user to more easily differentiate between the displayed character string.

7. The method of claim 1, wherein if centering the truncated part causes the truncated part to not reach either end of the string, then truncating at that location.

8. The method of claim 1, wherein the computing environment comprises a service oriented architecture (SOA) computing environment including a service registry of character strings.

9. A computer program product for truncating character strings in a computing environment, comprising a non-transitory computer usable medium including a computer readable program including program instructions, wherein the computer readable program when executed on a computer causes the computer to:
   receive a list including plural character strings;
   truncate one or more of the character strings to generate a display list of unique character strings based on determining a truncation location within each string, including:
      for each character string, comparing the string and corresponding Uniform Resource Identifier (URI), if the string is different from the URI, then truncating the beginning of the string, otherwise if the string matches the URI, then truncating the end of the string.

10. The computer program product of claim 9, further including program instructions for scoring each character in the string for similarity to the other characters in the display list and then finding the lowest scoring N characters where N is the length of the truncated string.

11. The computer program product of claim 9, further including program instructions for displaying the character strings of the display list in context with each other on a user interface, wherein each displayed character string is unique in relation to the other displayed character strings, enabling a user to more easily differentiate between the displayed character string.

12. The computer program product of claim 9, wherein if centering the truncated part causes the truncated part to not reach either end of the string, then truncating at that location.

13. The computer program product of claim 9, wherein the computing environment comprises a service oriented architecture (SOA) computing environment including a service registry of character strings.

14. A computer program product for truncating character strings in a computing environment, comprising a non-transitory computer usable medium including a computer readable program including program instructions, wherein the computer readable program when executed on a computer causes the computer to:
   receive a list including plural character strings; and
   truncate one or more of the character strings to generate a display list of unique character strings based on determining a truncation location within each string, including:
      placing the original character strings to be displayed in an original list, creating a new END list from the strings by truncating each original string at the end of the string, scoring each truncated string in the END list for similarity to other strings in the END list, creating a new BEGIN list of strings by truncating each original string at the beginning of the string, scoring each truncated string in the BEGIN list for similarity to other strings in the BEGIN list, creating a new MIX list of strings from the best scoring truncated strings, scoring each string in the MIX list for similarity to other strings in the MIX list, summing the scores in each list to create a total score for each list, and selecting the list with the lowest score as the display list.

15. The computer program product of claim 14, further including program instructions for scoring each character in the string for similarity to the other characters in the display list and then finding the lowest scoring N characters where N is the length of the truncated string.

16. The computer program product of claim 14, further including program instructions for displaying the character strings of the display list in context with each other on a user interface, wherein each displayed character string is unique in relation to the other displayed character strings, enabling a user to more easily differentiate between the displayed character string.

17. A system for truncating character strings in a computing environment, comprising:
   a hardware processor; and
   a user interface device that uses the hardware processor for receiving a list including plural character strings, and truncating one or more of the character strings for generating a display list of unique character strings based on determining a truncation location within each string by:
      for each character string, comparing the string and corresponding Uniform Resource Identifier (URI), if the string is different from the URI, then truncating the beginning of the string, otherwise if the string matches the URI, then truncating the end of the string;

wherein the user interface device uses the hardware processor to display the character strings of the display list in context with each other on a user interface.

18. The system of claim 17, wherein the user interface device uses the hardware processor to score each character in the string for similarity to the other characters in the display list and then finding the lowest scoring N characters where N is the length of the truncated string.

19. The system of claim 17, wherein each displayed character string is unique in relation to the other displayed character strings, enabling a user to more easily differentiate between the displayed character string.

20. The system of claim 17, wherein determining truncation location within each string includes: placing the original character strings to be displayed in an original list, creating a new END list from the strings by truncating each original string at the end of the string, scoring each truncated string in the END list for similarity to other strings in the END list, creating a new BEGIN list of strings by truncating each original string at the beginning of the string, scoring each truncated string in the BEGIN list for similarity to other strings in the BEGIN list, creating a new MIX list of strings from the best scoring truncated strings, scoring each string in the MIX list for similarity to other strings in the MIX list, summing the scores in each list to create a total score for each list, and selecting the list with the lowest score as the display list.

21. The system of claim 17, wherein the computing environment comprises a service oriented architecture (SOA) computing environment including a service registry of character strings.

* * * * *